(12) United States Patent
Falkenberg et al.

(10) Patent No.: US 11,330,047 B2
(45) Date of Patent: May 10, 2022

(54) WORK-LOAD MANAGEMENT IN A CLIENT-SERVER INFRASTRUCTURE

(71) Applicant: International Business Machines Corporation, Armonk, NY (US)

(72) Inventors: Matthias Falkenberg, Boeblingen (DE); Andreas Nauerz, Boeblingen (DE); Sascha Sambale, Stuttgart (DE); Sven Ole Stueven, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 992 days.

(21) Appl. No.: 15/398,449

(22) Filed: Jan. 4, 2017

(65) Prior Publication Data
US 2017/0118278 A1 Apr. 27, 2017

Related U.S. Application Data

(63) Continuation of application No. 14/060,655, filed on Oct. 23, 2013, now Pat. No. 9,571,418.

(51) Int. Cl.
*H04L 67/1008* (2022.01)
*H04L 67/025* (2022.01)
(Continued)

(52) U.S. Cl.
CPC .......... *H04L 67/1014* (2013.01); *H04L 43/16* (2013.01); *H04L 47/821* (2013.01);
(Continued)

(58) Field of Classification Search
CPC ... H04L 67/1014; H04L 67/42; H04L 67/025; H04L 43/16; H04L 67/1008; H04L 47/821
See application file for complete search history.

(56) References Cited

U.S. PATENT DOCUMENTS

2002/0078130 A1  6/2002  Thornton et al.
2002/0143847 A1  10/2002  Smith
(Continued)

FOREIGN PATENT DOCUMENTS

GB  2507294 A   4/2014
WO  03032185 A1  4/2003

OTHER PUBLICATIONS

Fielding, R. et al., "Hpertext Transfer Protocol—HTTP/1.1," [online] The Internet Society (c) 1999, Jun. 1999, retrieved from the Internet: <http://www.ietf.org/rfc/rfc2616.txt>, 173 pg.
(Continued)

*Primary Examiner* — Soe Hlaing
(74) *Attorney, Agent, or Firm* — Cuenot, Forsythe & Kim, LLC

(57) ABSTRACT

Work-load management in a client-server infrastructure includes setting request information in accordance with request semantics corresponding to a type of request from a client. The request semantics include different request-types provided with different priorities during processing. Within a server, requests with high priority are included in a standard request processing queue. Further, requests with low priority are excluded from the standard request processing queue when server workload of the server exceeds a predetermined first threshold value.

20 Claims, 10 Drawing Sheets

(51) Int. Cl.
*H04L 43/16* (2022.01)
*H04L 67/1014* (2022.01)
*H04L 47/70* (2022.01)
*H04L 67/01* (2022.01)

(52) U.S. Cl.
CPC ........ *H04L 67/025* (2013.01); *H04L 67/1008* (2013.01); *H04L 67/42* (2013.01)

(56) References Cited

U.S. PATENT DOCUMENTS

| | | | |
|---|---|---|---|
| 2003/0009505 A1* | 1/2003 | Cuomo | H04L 29/06 718/103 |
| 2003/0188013 A1 | 10/2003 | Nishikado et al. | |
| 2005/0125508 A1 | 6/2005 | Smith et al. | |
| 2005/0273456 A1* | 12/2005 | Revanuru | G06F 9/505 |
| 2008/0031258 A1 | 2/2008 | Acharya et al. | |
| 2008/0098395 A1 | 4/2008 | Backer | |
| 2008/0168125 A1 | 7/2008 | Chen et al. | |
| 2009/0055891 A1 | 2/2009 | Okamoto et al. | |
| 2009/0183162 A1 | 7/2009 | Kindel et al. | |
| 2009/0210876 A1 | 8/2009 | Shen et al. | |
| 2010/0318667 A1* | 12/2010 | Miller | H04L 67/02 709/228 |
| 2012/0215741 A1* | 8/2012 | Poole | H04L 67/1095 707/634 |
| 2012/0254204 A1 | 10/2012 | Pryor-Miller et al. | |
| 2013/0198620 A1* | 8/2013 | Zhou | G06F 17/217 715/255 |
| 2014/0122682 A1 | 5/2014 | Falkenberg et al. | |

OTHER PUBLICATIONS

Moore, K., "MIME (Multipurpose Internet Mail Extensions) Part Three: Message Header Extensions for Non-ASCII Text," [online] University of Tennessee, Nov. 1996, retrieved from the Internet: <http://www.ietf.org/rfc/rfc2047.txt>, 15 pg.
UK Appln. No. GB1219153.2, Search Report, dated Feb. 22, 2013, 1 pg.
U.S. Appl. No. 14/060,655, Non-Final Office Action, dated Jul. 2, 2015, 9 pg.
U.S. Appl. No. 14/060,655, Final Office Action, dated Nov. 25, 2015, 13 pg.
U.S. Appl. No. 14/060,655, Notice of Allowance, dated Oct. 3, 2016, 8 pg.

* cited by examiner

WORK-LOAD MANAGEMENT IN A CLIENT-SERVER INFRASTRUCTURE

CROSS-REFERENCE TO RELATED APPLICATIONS

This application claims the benefit of United Kingdom Application Number 1219153.2 filed on Oct. 25, 2012, which is fully incorporated herein by reference.

BACKGROUND

One aspect of the efficient management of middleware like Web servers, application servers, and enterprise portal servers in a client-server infrastructure is workload management. In the best case, servers are neither idle nor working to full capacity. A reasonable goal might be to keep the workload close to the maximum capacity with a buffer for potential spikes.

In recent years a shift with respect to application programming has taken place. While middleware still processes server-side applications and delivers the results in response to client requests, an increasing number of application logic has started moving to the client. Servers merely deliver such applications as source or script code to the client, which takes care of the execution. At runtime the client-side applications continue to request resources from the server. It is common practice for them to distinguish between two main request types, namely synchronous and asynchronous requests.

Synchronous requests to the server are used whenever the application cannot proceed without the requested data, whereas asynchronous requests can be used to start long running server-side tasks that remain transparent to the user. They also come into play when the response from the server can be injected into the application dynamically no matter when it is received. In any case, the user should be able to continue working with the application while the server-side processing is done in the background without blocking the application flow.

At present, the paradigm shift in regards to client-server applications is unused for managing the workload of middleware products. Synchronous and asynchronous requests are handled by servers in the same way even when they reach their capacity limits. The client-side part of Web applications cannot influence the priority of a request sent to the server, although, the Web application knows best about the semantics and the corresponding importance of the data and resources it requests.

BRIEF SUMMARY

A method for work-load management in a client-server infrastructure includes setting request information in accordance with request semantics corresponding to a type of request from a client. The request semantics include different request-types provided with different priorities during processing. The method further includes, within a server, including requests with high priority in a standard request processing queue and excluding requests with low priority from the standard request processing queue when server workload of the server exceeds a predetermined first threshold value.

A system includes a client running at least one client-side Web application component and a Web application server with a Web application engine running at least one server-side Web application component. The client is configured to transmit requests with request information corresponding to request type. Different request-types provide different priorities during processing. A request queue controller of the Web application server includes requests with high priority corresponding to a first request type in a standard request processing queue and excludes requests with low priority corresponding to a second request type from the standard request processing queue when server workload of the Web application server exceeds a predetermined first threshold value.

A computer program product for work-load management in a client-server infrastructure includes a computer readable storage medium having program code stored thereon. The program code is executable by a processor to perform a method. The method includes setting, within a server, request information in accordance with request semantics corresponding to a type of request from a client. The request semantics include different request-types provided with different priorities during processing. The method further includes, within the server, including requests with high priority in a standard request processing queue and, within the server, excluding requests with low priority from the standard request processing queue when server workload of the server exceeds a predetermined first threshold value.

BRIEF DESCRIPTION OF THE SEVERAL VIEWS OF THE DRAWINGS

Preferred embodiments of the present invention, as described in detail below, are shown in the drawings, in which.

DETAILED DESCRIPTION

Figure 1:
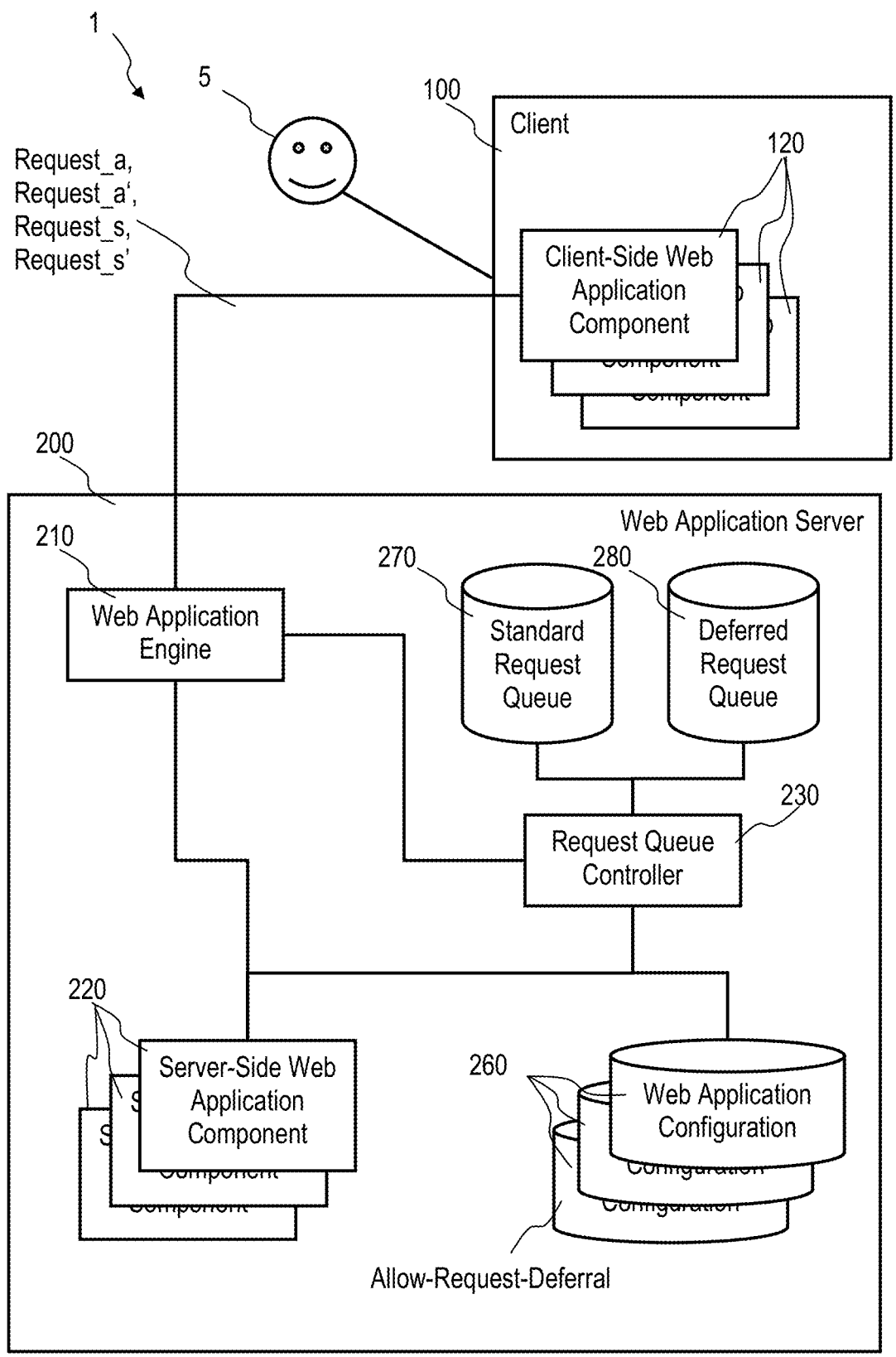
FIG. 1 is a schematic block diagram of a client-server infrastructure, in accordance with a first embodiment of the present invention.

This disclosure relates to a client-server communication, and more specifically to a method for work-load management in a client-server infrastructure and a corresponding client-server infrastructure performing the method for work-load management. This disclosure further relates to a data processing program and a computer program product for work-load management in a client-server infrastructure.

The technical problem underlying embodiments of the present invention is to provide a method for work-load management in a client-server infrastructure and a corresponding client-server infrastructure, which are able to deduce the priority of requests from the importance of the corresponding response for the requesting client-side part or Web applications while avoiding shortcomings and pain points of prior art work-load management in a client-server infrastructure.

In one aspect, this problem is solved by providing a method for work-load management in a client-server infrastructure having the features of claim 1, a client-server infrastructure having the features of claim 9, a data processing program for work-load management in a client-server infrastructure having the features of claim 14, and a computer program product for work-load management in a client-server infrastructure having the features of claim 15. Advantageous embodiments of the present invention are mentioned in the subclaims.

Accordingly, in an embodiment of the present invention a method for work-load management in a client-server infrastructure includes setting request information in accordance with request semantics corresponding to a type of request, wherein the request semantics include different request-types provided with different priorities during processing; including requests with high priority in a standard request processing queue; and excluding requests with low priority from said standard request processing queue when server workload exceeds a predetermined first threshold value.

In further embodiments of the present invention, a first request type represents synchronous requests with a high priority and a second request type represents asynchronous requests with a low priority; providing higher priority to the synchronous requests over asynchronous requests during processing.

In further embodiments of the present invention, a third request type represents a first interrupt request signaling the server to reprioritize a corresponding asynchronous request to high priority. A fourth request type represents a second interrupt request signaling the server to reprioritize a corresponding synchronous request to low priority.

In further embodiments of the present invention, the server responds to the interrupt requests with a no content response signaling the reprioritization of the corresponding request to the client.

In further embodiments of the present invention, requests with low priority are included in the standard request processing queue in at least one of the following cases: Server workload falls below the given threshold or wait time of the low priority request exceeds a predetermined second threshold value or low priority request is reprioritized to high priority.

In further embodiments of the present invention, requests with high priority are excluded from the standard request processing queue if the high priority request is reprioritized to low priority.

In further embodiments of the present invention, the request type information is included in a header of the request.

In another embodiment of the present invention, a client-server infrastructure includes a client running at least one client-side Web application component and a Web application server with a Web application engine running at least one server-side Web application component; wherein said client transmits requests with request information corresponding to request type; wherein different request-types provide different priorities during processing; and wherein a request queue controller of the Web application server includes requests with high priority in a standard request processing queue and excludes requests with low priority from the standard request processing queue when server workload exceeds a predetermined first threshold value.

In another embodiment of the present invention, a data processing program for execution in a data processing system includes software code portions for performing a method for work-load management in a client-server infrastructure when the program is run on the data processing system.

In yet another embodiment of the present invention, a computer program product stored on a computer-usable medium, includes computer-readable program means for causing a computer to perform a method for work-load management in a client-server infrastructure when the program is run on the computer.

This specification describes a method for work-load management in a client-server infrastructure deducing the priority of requests from the importance of the corresponding response for the requesting client-side component of an application. When implementing client-side components of the application, developers build in certain semantics by using either synchronous or asynchronous requests to communicate with the server, for example, to load data displayed by the application.

Synchronous requests indicate a high importance. The client-side components of the application cannot continue working without the response to the request. It interrupts any processing until the response is received. The user cannot interact with the application until the middleware responds by sending the requested data and/or completing a certain task triggered by the request.

Asynchronous requests indicate a lower importance. The client-side components of the application do not rely on an immediate response to the request. They continue reacting on user input and process other events that might occur while waiting for the server to respond. When the requested data is received and/or the server indicates that the task triggered by the request is completed, the client-side components of the application process the response, for example, by refreshing a part of the user interface with the acquired data or resource.

The information whether a request is synchronous or asynchronous gives the middleware a valuable hint on how to prioritize requests, for example, when it does not have the capacity to respond to all incoming requests in a timely manner to comply with the company's service level agreement on maximum response times, it is able to bring forward the requests that most affect the business users working with the application.

Embodiments of the present invention propose to transmit the request type—synchronous or asynchronous—to the server or other middleware products in a client-server environment. Additionally, embodiments of the present invention describe a strategy for prioritizing requests based on the request type. Further, embodiments of the present invention explain the management of asynchronous requests that have been excluded from the processing queue. In addition, embodiments of the present invention describe a mechanism to allow the client-side components of applications to reprioritize previous requests that have not been answered by the receiving application server or other middleware products yet. Finally, embodiments of the present invention propose a mechanism to include the configuration and the runtime of server-side applications components in the determination of request priorities in a static and in a dynamic fashion, respectively.

The above, as well as additional purposes, features, and advantages of the present invention will become apparent in the following detailed written description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring now to FIGS. 1 to 7, a client-server infrastructure 1, according to a first embodiment of the present invention, allowing a user 5 to run a corresponding Web application includes a client 100 running at least one client-side Web application component 120 and a Web application server 200 with a Web application engine 210 running at least one server-side Web application component 220. The client 100 transmits requests Request_a, Request_a', Request_s, Request_s' with request information corresponding to request type; wherein different request-types provide different priorities during processing. A request queue controller 230 of the Web application server 200 includes requests Request_s with high priority in a standard request processing queue 270; and excludes requests Request_a with low priority from the standard request processing queue 270 when server workload exceeds a predetermined first threshold value. In the shown embodiment the request queue controller 230 includes the requests Request_a with low priority to a deferred request queue 280.

Embodiments of the present invention propose the inclusion of the request type in the HTTP request header the client, for example a Web browser, sends to the Web application server 200 or other middleware products in a client-server infrastructure 1. As mentioned in RFC2616 (see also http://www.ietf.org/rfc/rfc2616.txt), HTTP can and does use constructs defined for the Multipurpose Internet Mail Extensions (cp. Section 19.4). In order to comply with the corresponding RFC2047 (see also http://www.ietf.org/rfc/rfc2047.txt) with regard to user-defined message header fields, the following HTTP header field is suggested: X-Request-Type. If specified, it has one of the two values 'sync' or 'async'. When sending a request Request_a, Request_a', Request_s, Request_s' to the server 200, the client-side components 120 of the application set the HTTP header field using the value that matches the semantics of the request Request_a, Request_a', Request_s, Request_s'.

The server 200 or other middleware receiving the request Request_a, Request_a', Request_s, Request_s' may decide to process the request Request_a, Request_a', Request_s, Request_s' without paying attention to the HTTP header field. However, if the server 200 is running at fully capacity, asynchronous requests Request_a are excluded from the standard processing queue 270 to free up resources required to handle incoming synchronous requests Request_s. Because the client-side Web application components 220 do not expect a prompt response on asynchronous requests Request_a such requests Request_a remain excluded until the workload of the server 200 falls under a defined threshold, a maximum wait time for asynchronous requests Request_a has been reached, an interrupt request Request_a' is received or specific events occur or specific conditions are met that indicate that a particular request must not be deferred any longer. Eventually, the asynchronous request Request_a is included into the standard request queue 270 again. If specified by the client 100, the proposed X-Request-Type HTTP header takes one of the following values: "sync" for a synchronous request Request_s, "async" for an asynchronous request Request_a, "irq_sync" for a first interrupt request and "irq_async" for a second interrupt request.

The request type value "sync" is used to signal the server 200 that the synchronous request Request_s has a high priority and must not be deferred. This request type refers to the state-of-the-art handling of requests. It is the default if the X-Request-Type header is not specified or if it carries an unknown value.

The request type value "async" is used to signal the server 200 that the asynchronous request Request_a can be deferred. The server 200 can put the processing of the asynchronous request Request_a off until specific events occur or conditions are met that indicate that the asynchronous request Request_a must not be deferred any longer.

The request type value "irq_sync" identifies a first interrupt request Request_a' to signal the server 200 that a yet unanswered asynchronous request Request_a for the same data or resources was issued before and must be reprioritized. The initial asynchronous request was issued using the request type value "async" but the client 100 has not received the response yet. Using the request type value "irq_sync" the client-side Web application components 120 inform the server 200 that the processing of the initial asynchronous request Request_a must not be deferred any longer. The initial asynchronous request Request_a must be included into the standard request queue 270. The server 200 can respond to such first interrupt requests Request_a' with HTTP status code 204 as response Response_a' to signal the completion of the operation without sending any content.

The request type value "irq_async" identifies a second interrupt request Request_s' to signal the server 200 that a yet unanswered synchronous request Request_s for the same data or resources was issued before and can be reprioritized. The initial synchronous request Request_s was issued using the request type value "sync" but the client 100 has not received the response yet. Using the request type value "irq_async" the client-side Web application components 120 inform the server 200 that the processing of the initial synchronous request Request_s can be deferred. The initial synchronous request Request_s can be excluded from the standard request queue 270 and included into the deferred request queue 280. The server 200 can respond to such second interrupt requests Request_s' also with the HTTP status code 204 as response Response_s' to signal the completion of the operation without sending any content.

Embodiments of the present invention also include the option for Web applications to influence the deferral of requests Request_a, Request_a', Request_s, Request_s' in addition to using the suggested X-Request-Type HTTP header. While the request type is specified by the client-side Web application components 120 upon sending a request Request_a, Request_a', Request_s, Request_s', the server-side components 220 can be included in making a decision about the deferral of requests Request_a, Request_a', Request_s, Request_s' in a static and in a dynamic way. The additional server-side decisions about the deferral of requests Request_a, Request_a', Request_s, Request_s'—in particular in situations when the server 200 cannot fully handle the workload—allows Web application server administrators (static server-side determination) and Web application developers (static and dynamic server-side determination) to include knowledge about the Web applications and the environment they are embedded into.

For the static server-side determination the Web application configuration data 260 can include a parameter, for example, allow-request-deferral, that indicates whether or not requests made by the client-side component 120 of the Web application can be deferred. This configuration parameter can override the X-Request-Type setting that is set by the client-side components 120.

Instead of using the static Web application configuration to specify whether requests can be deferred, the server 200 can also pass the request on to the server-side Web application components 220 for them to dynamically determine whether or not a specific request can be deferred. The server-side Web application components 220 can override the X-Request-Type setting that is set by the client-side components 120.

The server-side mechanisms for determining whether or not a specific request can be deferred can not only be combined with the request type information but also with each other. So both the Web application configuration 260 and the server-side Web application components 220 must allow the request deferral. Alternatively at least one of both the Web application configuration 260 and the server-side Web application components 220 must allow the request deferral, so both aspects are considered equal. Further one of both the Web application configuration 260 and the server-side Web application components must allow the request deferral, so one of the aspects can override the other.

Figure 2:
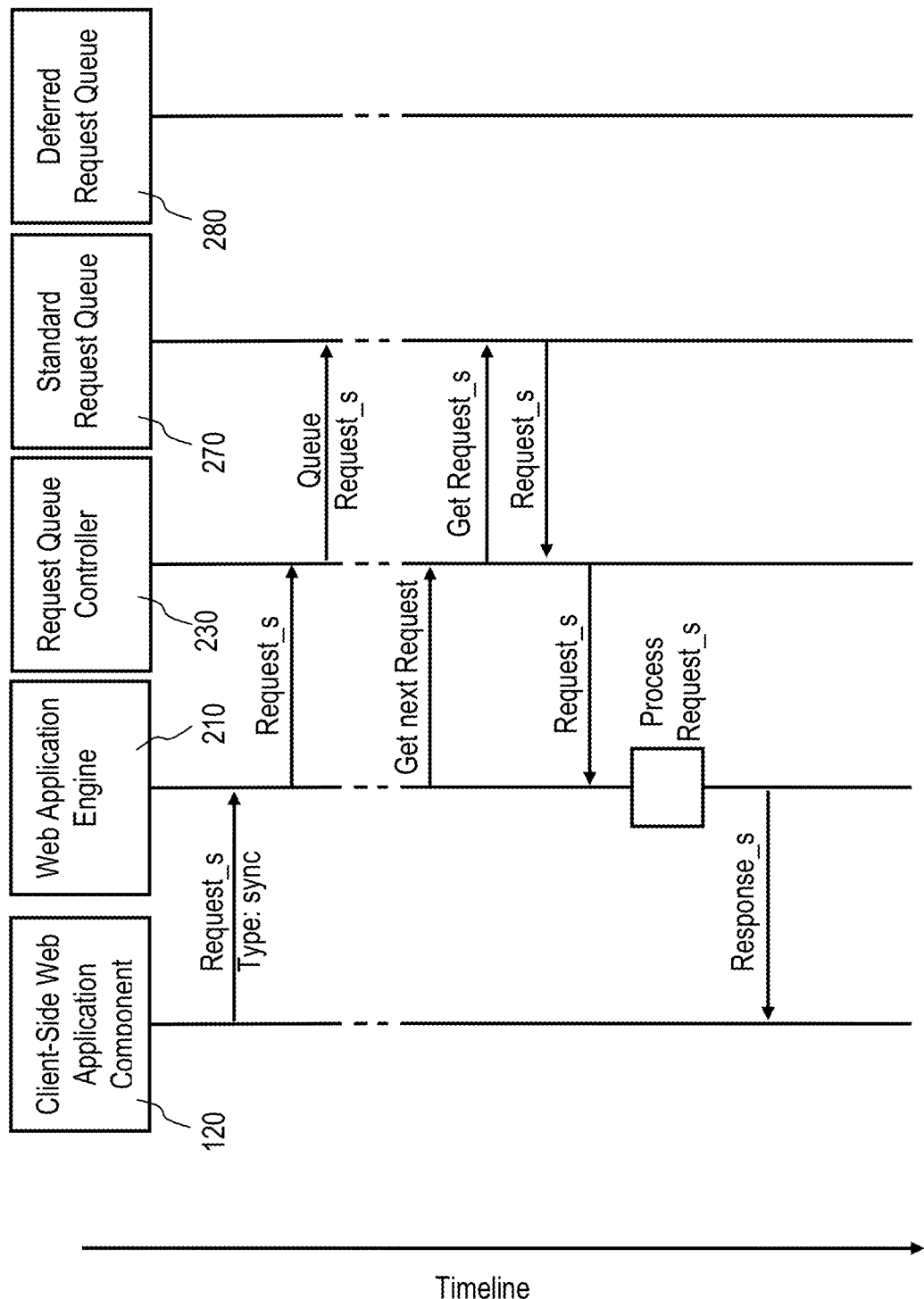
FIGS. 2 to 7 are schematic timing diagrams of different request handling processes performed by the client-server infrastructure, in accordance with an embodiment of the present invention.

FIG. 2 shows a first request handling process by the client-server infrastructure 1, in accordance with an embodiment of the present invention. The first request handling process is used for synchronous requests Request_s of the request type "sync". The first request handling process is also used as default if the X-Request-Type header is not specified or if it carries an unknown value. Referring to FIG. 2 the client-side Web application component 120 sends a synchronous Request_s of the request type value "sync". The Web application engine 210 transmits the synchronous request Request_s to the request queue controller 230 which queues the synchronous request Request_s into the standard request queue 270. The Web application engine 210 orders and processes the requests from the standard request queue 270 using the request queue controller 230. The request queue controller 230 gets the ordered synchronous request Request_s from the standard request queue 270 and transfers the synchronous request Request_s to the Web application engine 210 for processing. After processing the Web application engine 210 transmits the corresponding response Response_s to the client-side Web application component 120.

Figure 3:
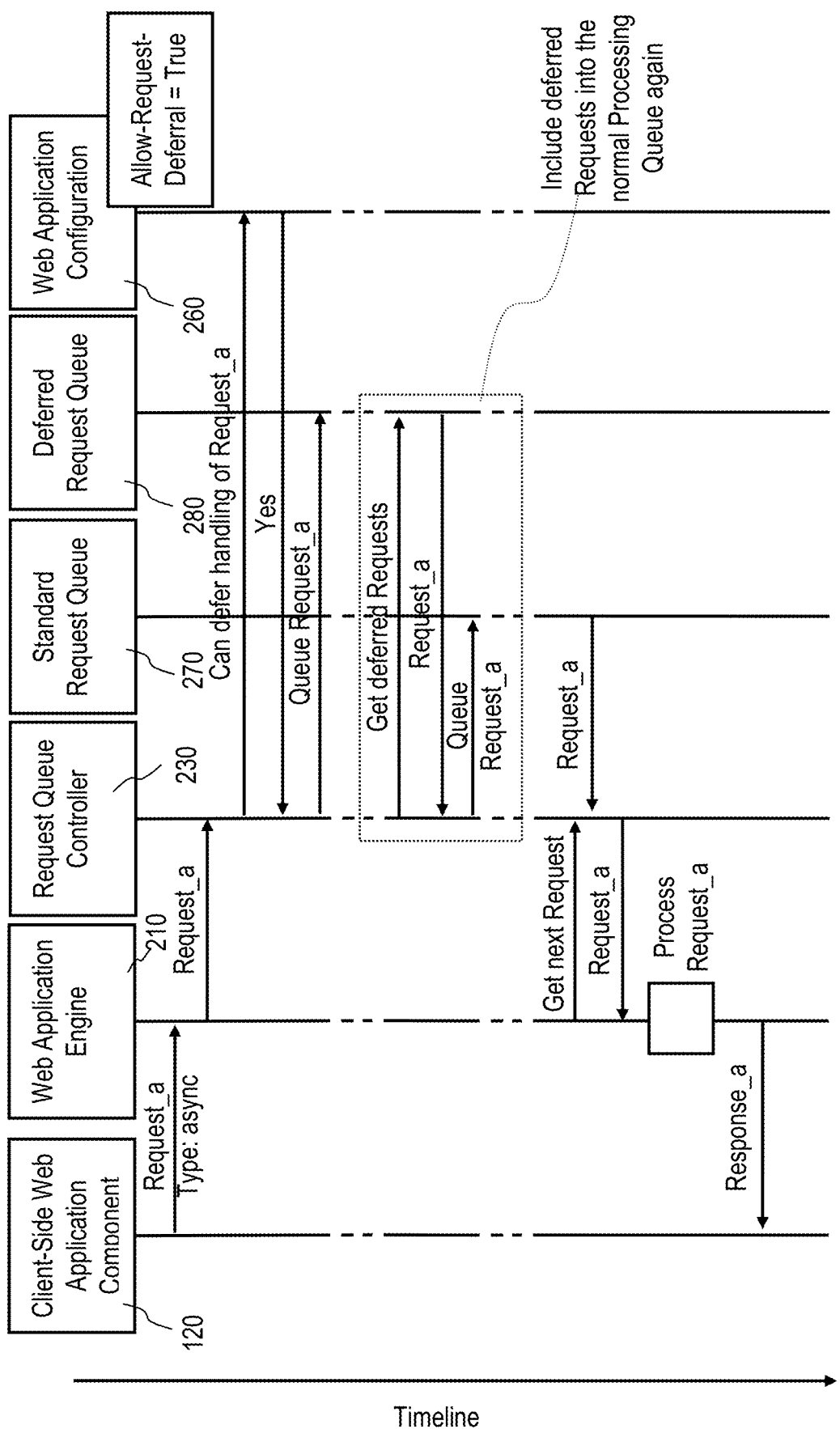

FIG. 3 shows a second request handling process by the client-server infrastructure 1, in accordance with an embodiment of the present invention. The second request handling process is used for asynchronous requests Request_a of the request type "async", wherein the static deferral support of the Web application configuration 260 is used. Referring to FIG. 3 the client-side Web application component 120 sends an asynchronous Request_a of the request type value "async". The Web application engine 210 transmits the asynchronous request Request_a to the request queue controller 230 which checks the further handling with the Web application configuration 260. If the attribute "Allow-Request-Deferral" of the Web application configuration 260 is set to true, the request queue controller 230 queues the asynchronous request Request_a into the deferred request queue 280. To include a deferred request into the normal processing queue e.g., the standard request queue 270 again the request queue controller 230 orders the deferred request, here the asynchronous request Request_a, from the deferred request Queue 280 and includes the asynchronous request Request_a into the standard request queue 270. The Web application engine 210 orders and processes the requests from the standard request queue 270 using the request queue controller 230. The request queue controller 230 gets the ordered asynchronous request Request_a from the standard request queue 270 and transfers the asynchronous request Request_a to the Web application engine 210 for processing. After processing the Web application engine 210 transmits the corresponding response Response_a to the client-side Web application component 120.

Figure 4:
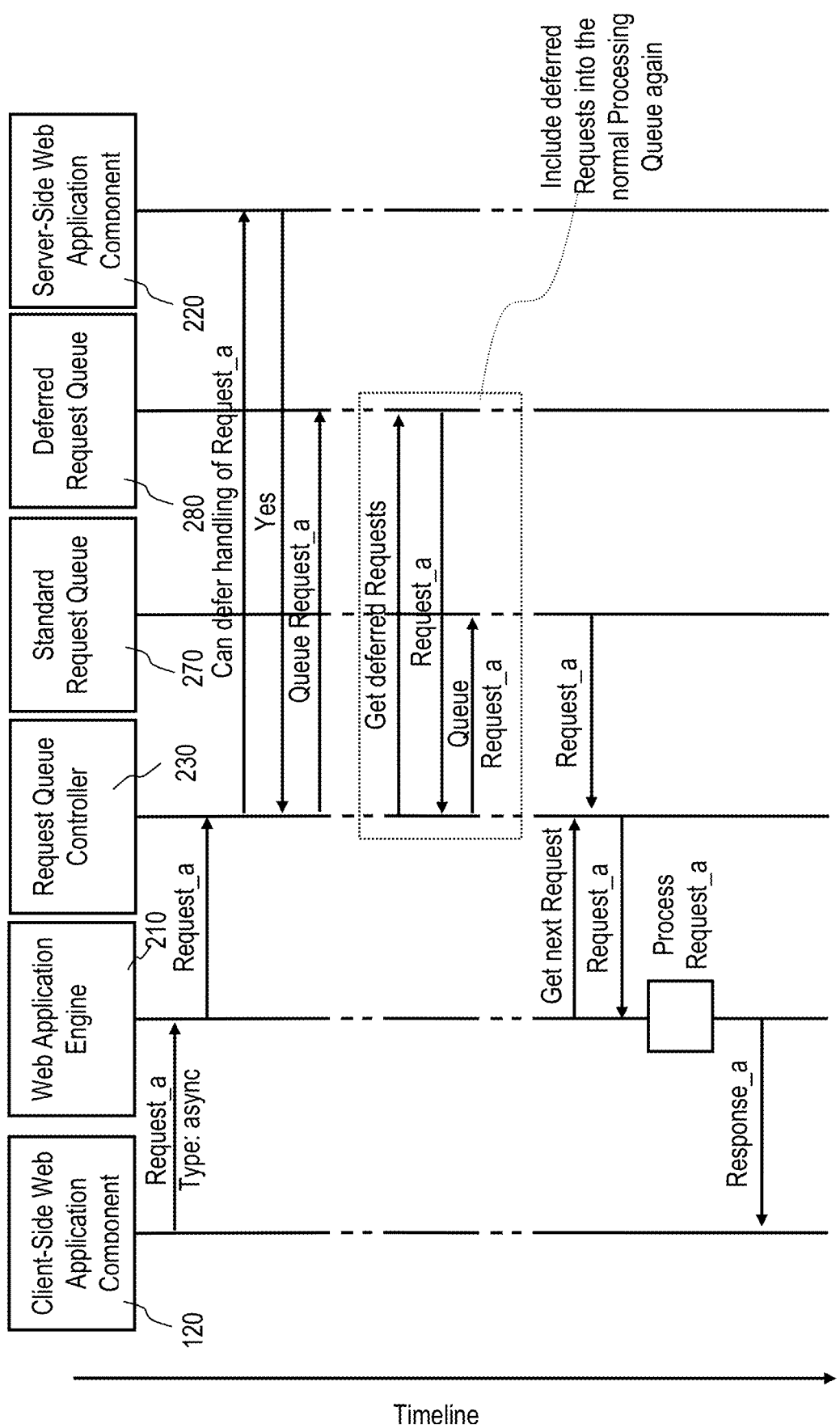

FIG. 4 shows a third request handling process by the client-server infrastructure 1, in accordance with an embodiment of the present invention. The third request handling process is used for asynchronous requests Request_a of the request type "async", wherein the dynamic deferral support of the server-side Web application component 220 is used. Referring to FIGS. 3 and 4 the third request handling process is nearly identical to the second request handling process therefore a description of identical parts of the request handling processes is omitted. Referring to FIG. 4 the client-side Web application component 120 sends an asynchronous Request_a of the request type value "async". The Web application engine 210 transmits the asynchronous request Request_a to the request queue controller 230. Now instead of checking the further handling with the Web application configuration 260 the request queue controller 230 instead checks the further handling with the server-side Web application component 220. So the communication between the request queue controller 230 and the Web application configuration 260 is replaced by a communication between the request queue controller 230 and the server-side Web application component 220. The server-side Web application component 220 determines dynamically if a corresponding request can be deferred or not. If the corresponding request can be deferred, the request queue controller 230 queues the asynchronous request Request_a into the deferred request queue 280 and the remaining steps of the third request handling process is identical to the second request handling process shown in FIG. 3.

Figure 5:
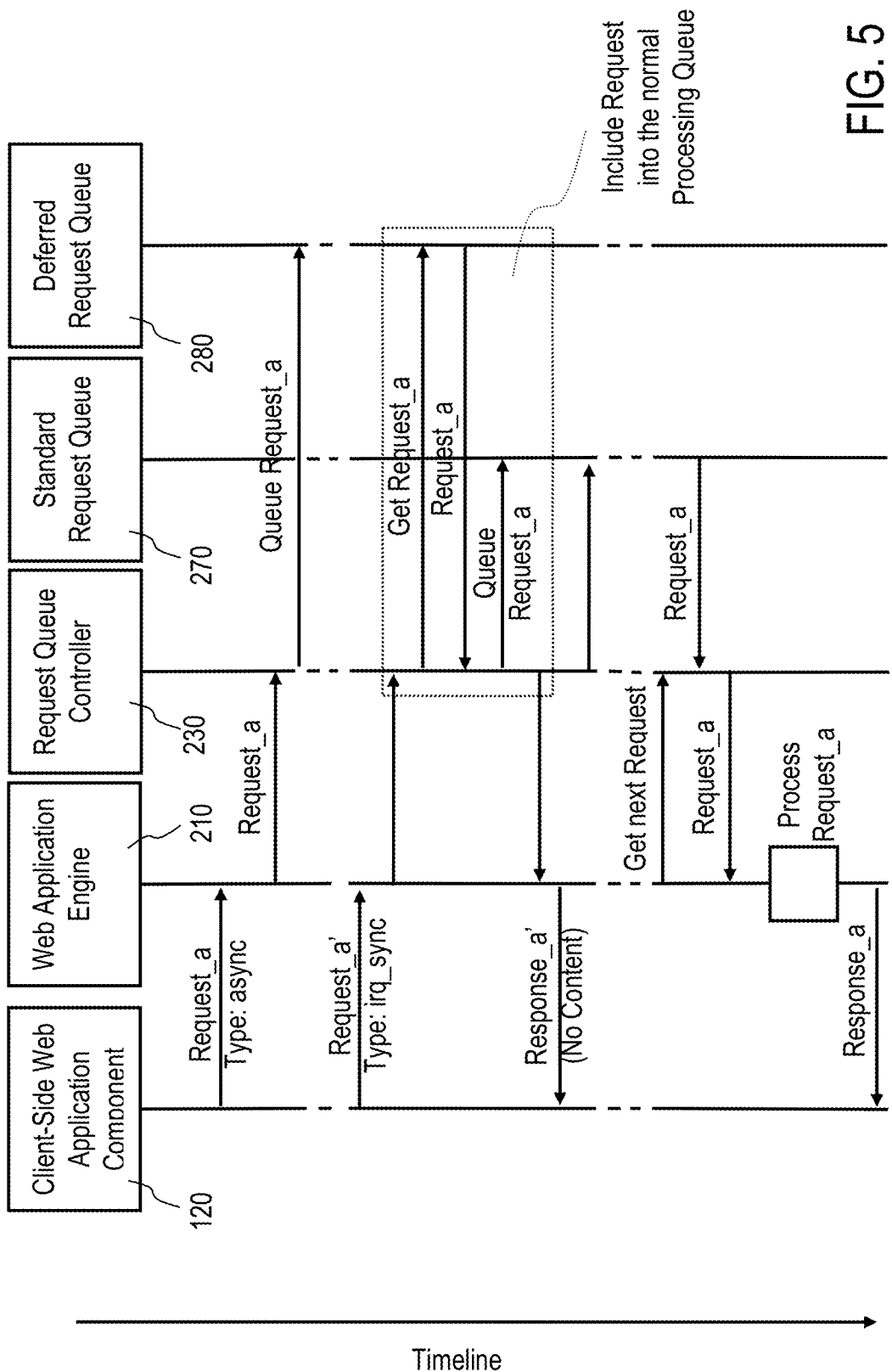

FIG. 5 shows a fourth request handling process by the client-server infrastructure 1, in accordance with an embodiment of the present invention. The fourth request handling process is used to reprioritize deferred asynchronous requests Request_a of the request type "async" to high priority by using the first interrupt request Request_a' of the request type "irq_sync". Referring to FIG. 5 the client-side Web application component 120 sends an asynchronous Request_a of the request type value "async". The Web application engine 210 transmits the asynchronous request Request_a to the request queue controller 230 which queues the asynchronous request Request_a into the deferred request queue 280. To reprioritize the deferred asynchronous request Request_a, the client-side Web application component 120 sends the first interrupt request Request_a' to the Web application engine 210. The Web application engine 210 transmits the first interrupt request Request_a' to the request queue controller 230 which reprioritizes the deferred asynchronous request Request_a and includes it into the standard request queue 270. To include the request into the normal processing queue and to reprioritize the deferred asynchronous request Request_a, the request queue controller 230 orders the deferred asynchronous request Request_a from the deferred request Queue 280 and includes the asynchronous request Request_a into the standard request queue 270. The request queue controller 230 signalizes this reprioritization of the deferred asynchronous request Request_a by transmitting an acknowledge signal Response_a', like a HTTP 204 message, with no content to the client-side Web application component 120. Further the Web application engine 210 orders and processes the requests from the standard request queue 270 using the request queue controller 230. The request queue controller 230 gets the ordered reprioritized asynchronous request Request_a from the standard request queue 270 and transfers the asynchronous request Request_a to the Web application engine 210 for processing. After processing the Web application engine 210 transmits the corresponding response Response_a to the client-side Web application component 120.

Figure 6:
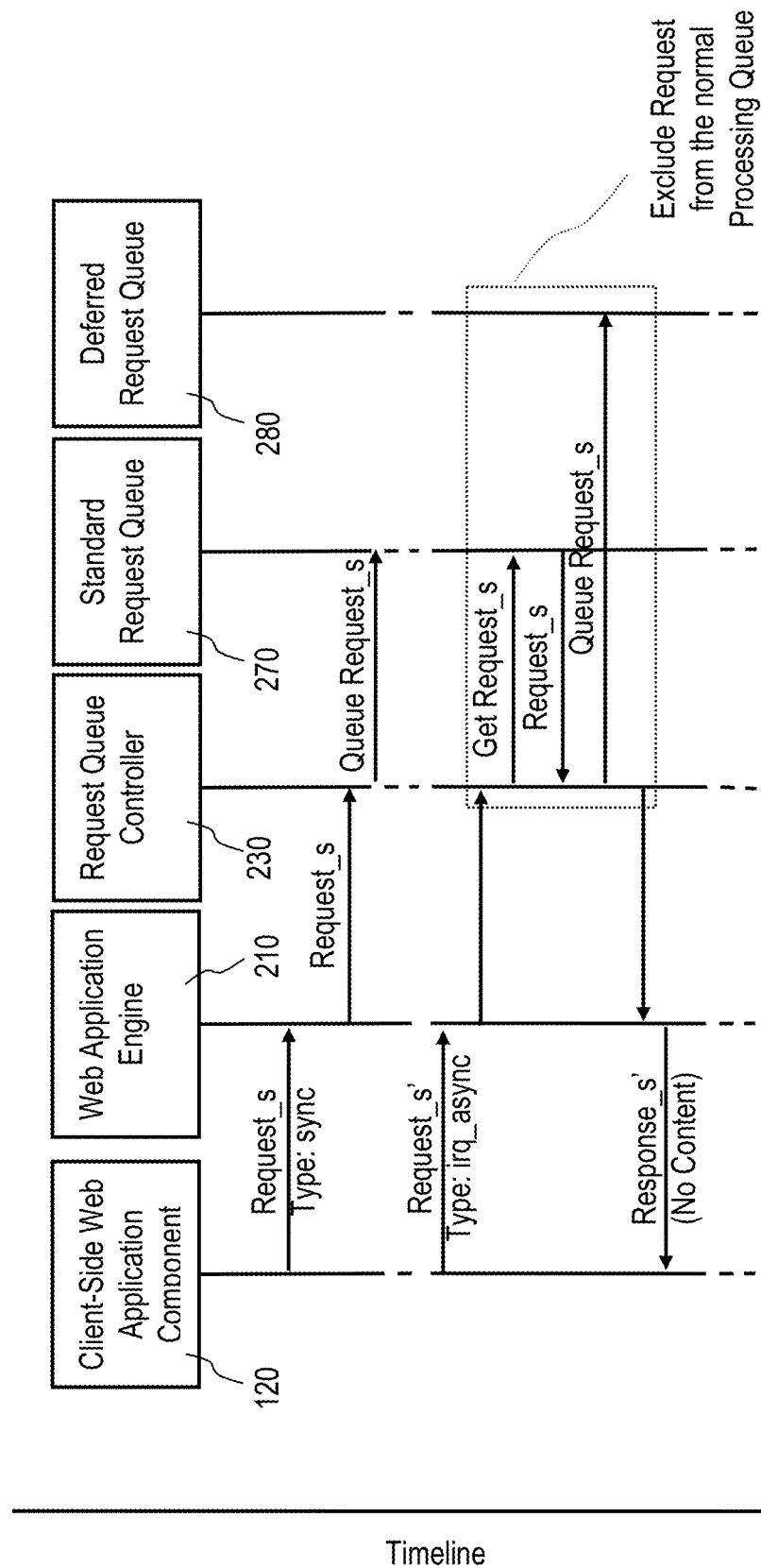
Figure 7:
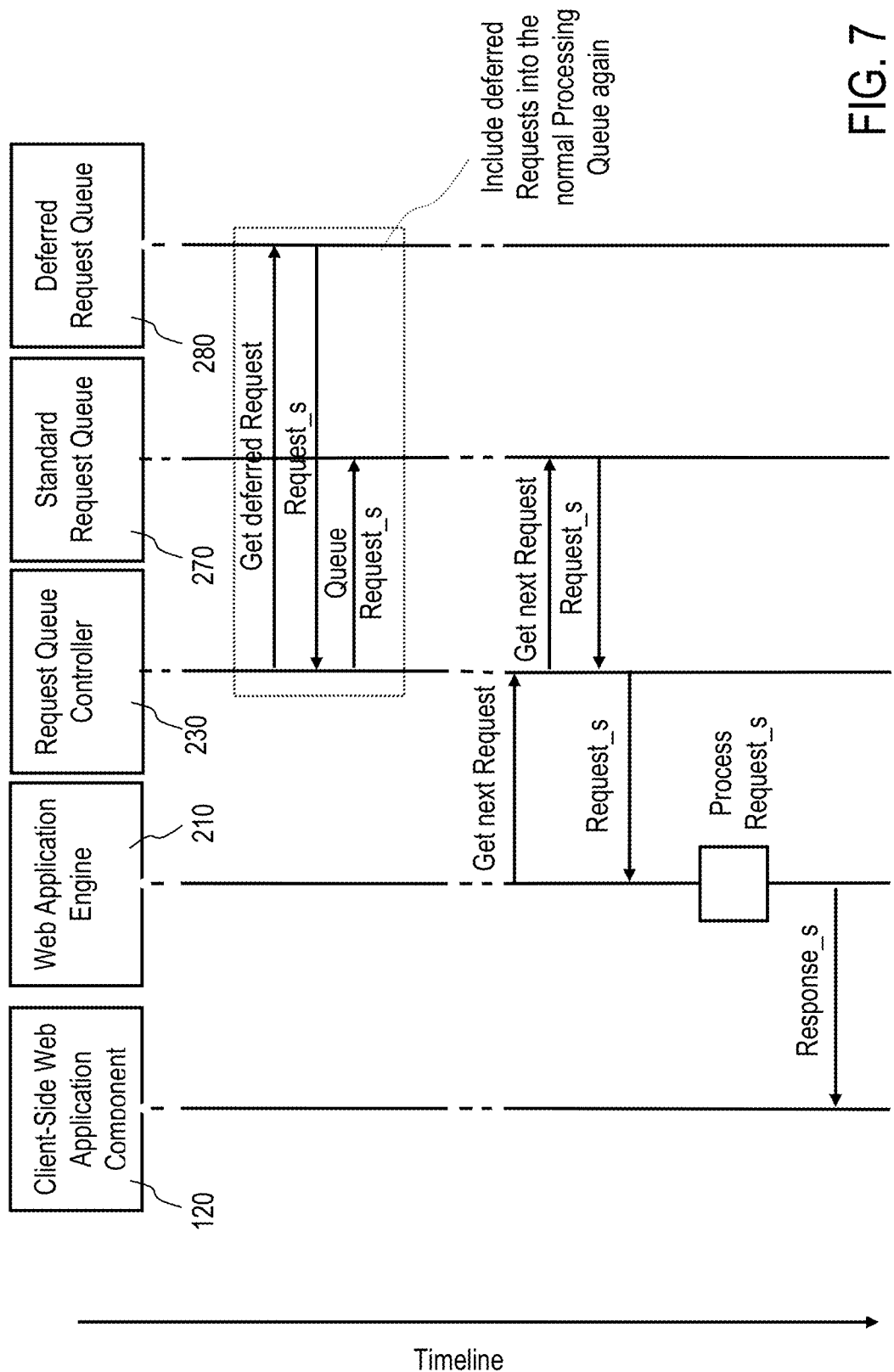

FIGS. 6 and 7 show a fifth request handling process by the client-server infrastructure 1, in accordance with an embodiment of the present invention. The fifth request handling process is used to reprioritize and defer a synchronous request Request_s of the request type "sync" to low priority by using the second interrupt request Request_s' of the request type "irq_async". Referring to FIGS. 6 and 7, the client-side Web application component 120 sends a synchronous Request_s of the request type value "sync" to the web application engine 210. The Web application engine 210 transmits the synchronous request Request_s to the request queue controller 230 which queues the synchronous request Request_s into the standard request queue 270. To reprioritize and defer the synchronous request Request_s, the client-side Web application component 120 sends the second interrupt request Request_s' to the Web application engine 210. The Web application engine 210 transmits the second interrupt request Request_s' to the request queue controller 230 which reprioritizes and defers the synchronous request Request_s and excludes it from the standard request queue 270. To exclude the request from the normal processing queue and to reprioritize and defer the synchronous request Request_s, the request queue controller 230 orders the synchronous request Request_s from the standard request Queue 270 and includes the synchronous request Request_s into the deferred request queue 280. The request queue controller 230 signalizes this reprioritization of the synchronous request Request_s by transmitting an acknowledge signal Response_s', like a HTTP 204 message, with no content to the client-side Web application component 120. To include the deferred synchronous request Request_s into the normal processing queue e.g., the standard request queue 270 again, the request queue controller 230 orders the deferred synchronous request Request_s from the deferred request Queue 280 and includes the synchronous request Request_s into the standard request queue 270. Further the Web application engine 210 orders and processes the requests from the standard request queue 270 using the request queue controller 230. The request queue controller 230 gets the ordered reprioritized synchronous request Request_s from the standard request queue 270 and transfers the synchronous request Request_s to the Web application engine 210 for processing. After processing the Web application engine 210 transmits the corresponding response Response_s to the client-side Web application component 120.

Figure 8:
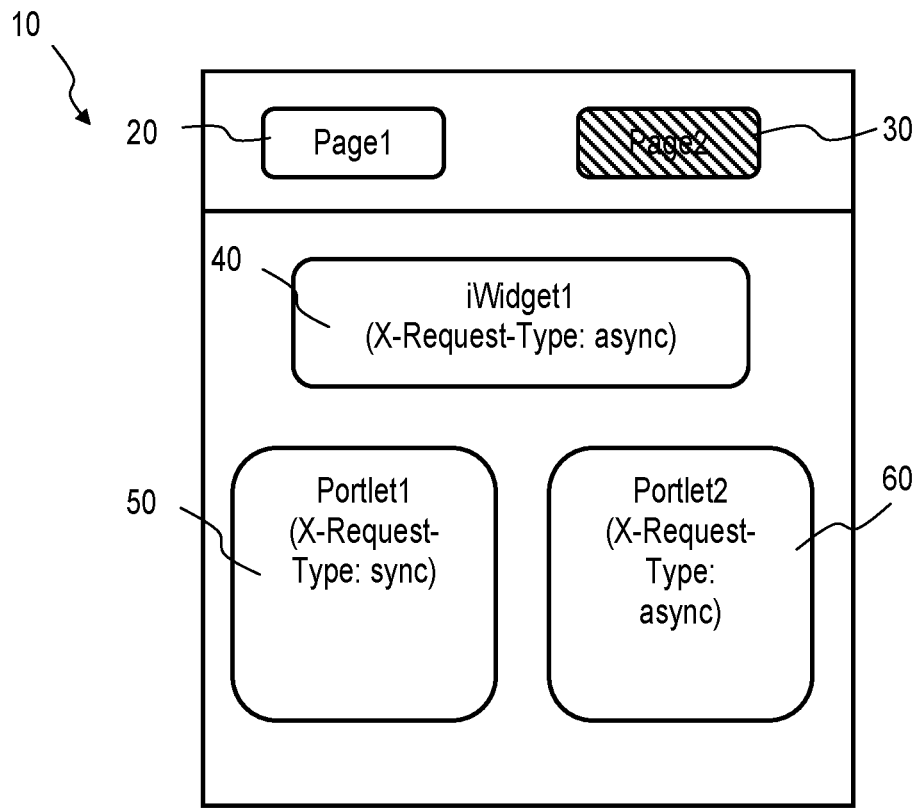
FIGS. 8 to 10 are schematic block diagrams of an enterprise Web portal example performing a method for workload management in a client-server infrastructure, in accordance with an embodiment of the present invention.
Figure 9:
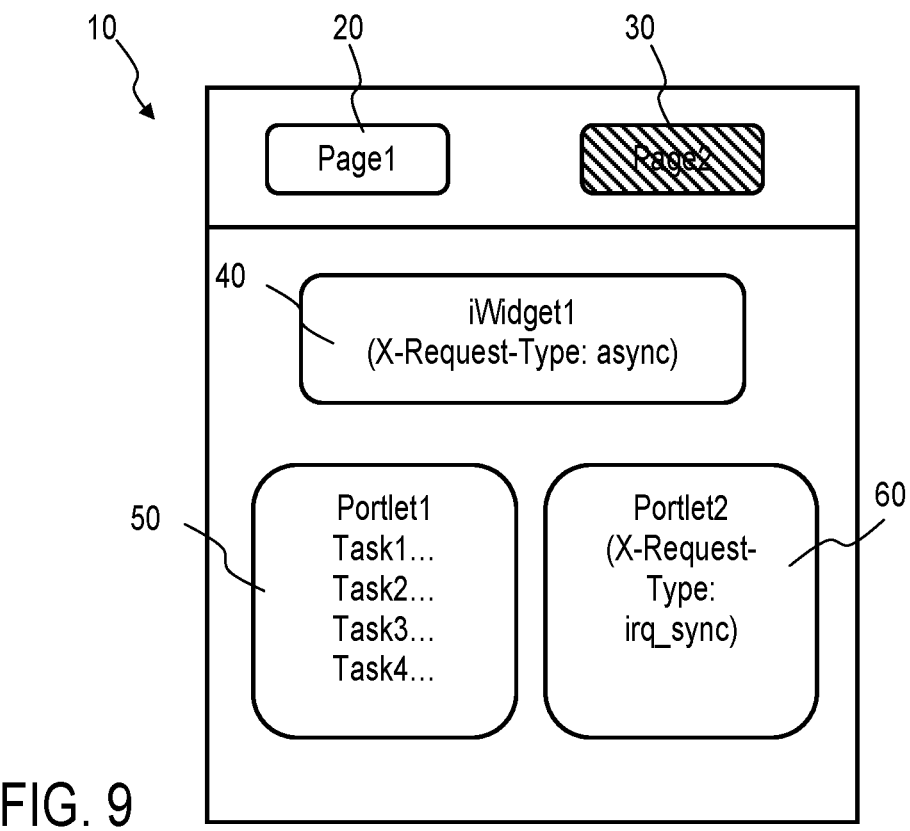
Figure 10:
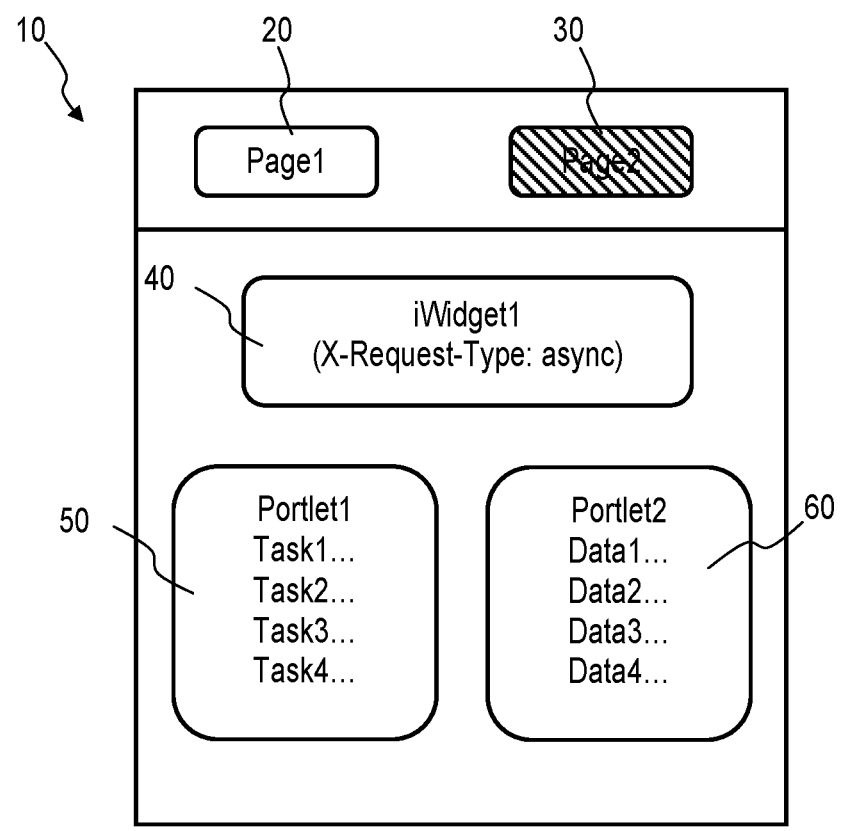

FIGS. 8 to 10 show an enterprise Web portal example performing a method for workload management in a client-server infrastructure 1, in accordance with an embodiment of the present invention.

Referring to FIGS. 8 to 10 the sample site 10 of an enterprise portal renders a dashboard including links 20, 30 to navigate between a first portal page Page1 and a second portal page Page2, wherein the second portal page Page2 is currently selected, indicated by a shaded block, an output of an iWidget iWidget1 and outputs of a first portlet Portlet1 and a second portlet Portlet2. The iWidget iWidget1 loads information on current weather, for example. The iWidget iWidget1 refreshes the information by sending asynchronous requests Request_a addressing the server-side Web application component 220. That component 220 gets relevant data from an external service. The iWidget iWidget1 can inject the data dynamically when it becomes available. The first portlet Portlet1 displays important tasks the user 5 visiting the site 10 has to take care of as soon as possible. The corresponding requests are synchronous. The second portlet Portlet2 loads account data important to users 5 of the site 10. Retrieving the data requires the server 200 to access an external database. To prevent the Web browser from freezing until the response is received, the request is asynchronous. The second portlet Portlet2 can inject the data dynamically when it becomes available.

In case the enterprise portal server 200 is under heavy load, embodiments of the present invention allow the server 200 to prioritize some requests higher than others. The processing of asynchronous requests Request_a of the client-side code of the second portlet Portlet2 and the iWidget iWidget1 are deferred resulting in a faster response of the server 200 to synchronous requests Request_s that freeze the Web browser. As a result the most essential information can be made available despite the workload. The first portlet Portlet1 receives task information Task1 to Task4 of the user 5. The second portlet Portlet2 and the iWidget iWidget1 are not refreshed immediately. But the account data Data1 to Data4 that the second portlet Portlet2 has requested can also be important to the user 5 of the site 10. There are several ways to prevent the request from getting deferred (static and dynamic server-side determination of request deferral support; reaching a maximum wait time before reprioritizing the request, etc.). In this scenario, the second portlet Portlet2 issues the same request again but uses the first interrupt request Request_a' of the request type "irq_sync". The prioritization of requests allows the server 200 to put off asynchronous request Request_a with low importance and low priority in the semantics context to answer the more essential synchronous request Request_s even under heavy load. The user 5 could continue working, because the Web browser did not freeze. In the given scenario, the most essential information from the user perspective was requested by the client-side Web application components 220 in a synchronous fashion. The asynchronous request Request a made by the iWidget iWidget1 will be answered in the end. But as the priority of the weather data is not crucial in the given semantics context, the request might continue being deferred until the workload of the server 200 drops significantly.

Figure 11:
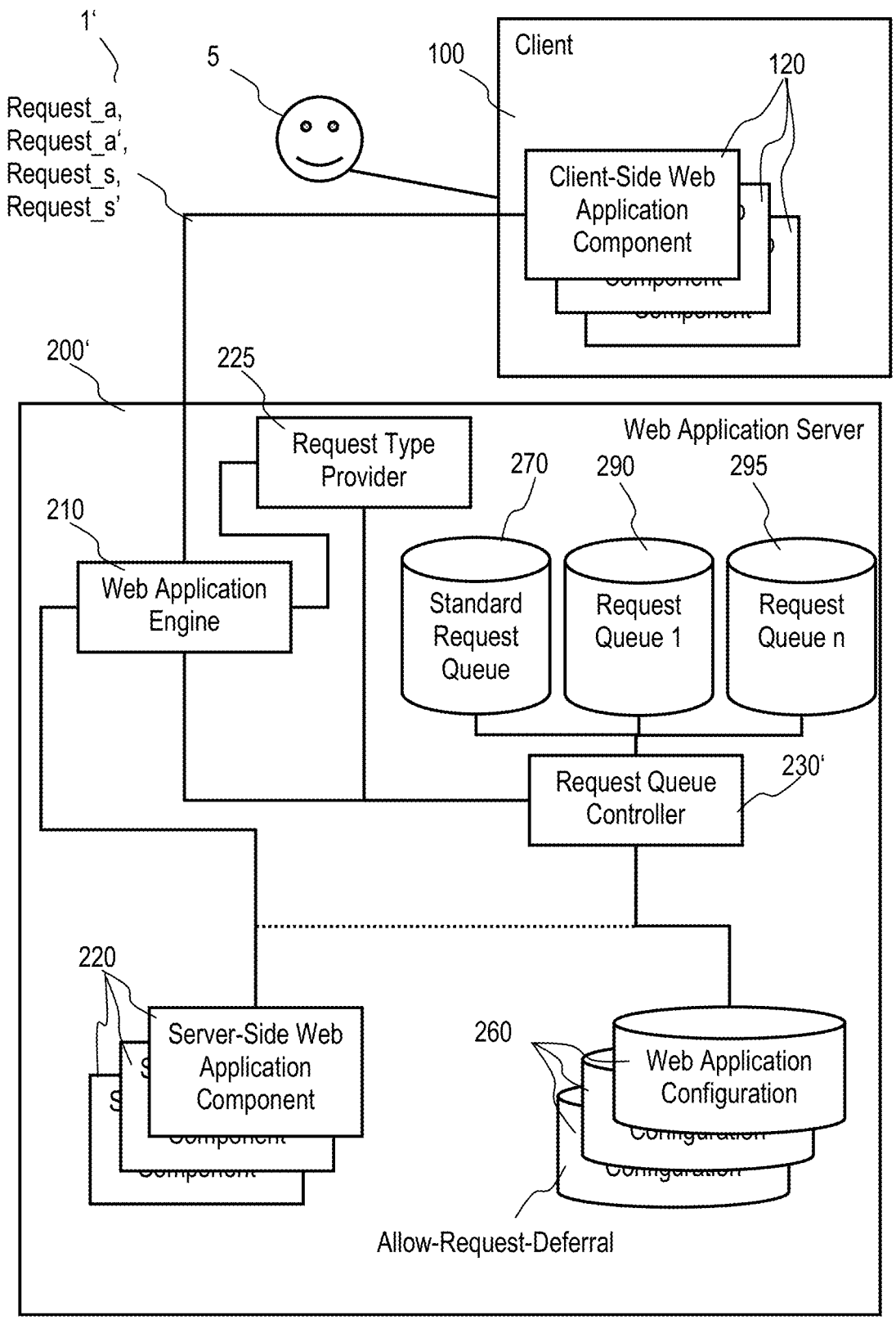
FIG. 11 is a schematic block diagram of a client-server infrastructure, in accordance with a second embodiment of the present invention.

FIG. 11 shows a client-server infrastructure 1', in accordance with a second embodiment of the present invention. Embodiments of the present invention can be extended by allowing developers or server administrators to define the available request types as well as the strategy of handling requests using said request types. While the previous pages detail a method and a system that uses four specific request types "sync", "async", "irq_sync", irq_async" a more general approach can allow for plugging custom request types. Referring to FIGS. 1 and 11 the second embodiment of the client-server infrastructure 1' shown in FIG. 11 is nearly identical to the first embodiment of the client-server infrastructure 1 shown in FIG. 1 therefore a description of identical parts of the client-server infrastructures 1, 1' is omitted.

Referring to FIG. 11, in contrast to the first embodiment the request types can be registered with a request type provider 225 being part of the Web application server 200. Web applications can use the request type provider 225 to look up the available request types and the implied priority or semantic meaning. In addition, the strategy for determining the priority of a particular request can be customized by plugging a custom request queue controller 230'. Consequently, custom request types in combination with the custom request queue controller 230 can leverage a plurality of deferred request queues 290, 295.

What is claimed is:

1. A computer-implemented method within a server having a standard request processing queue and a deferred request queue, comprising:
receiving, from a client and by the server, a first request and accompanying request information identifying the first request as a first type of request;
selecting between the standard request processing queue and the deferred request queue based upon the first type of request;
including, based upon the selecting, the first request in the standard request processing queue;

receiving, by the server, a second request and accompanying request information identifying the second request as a second type of request;
determining that a server workload of the server exceeds a predetermined first threshold value; and
excluding, based upon the second type of request and only upon the determining, the second request from the standard request processing queue by including the second request in the deferred request queue, wherein
the first type of request indicates a higher priority, and
the second type of request indicates a lower priority.

2. The method of claim 1, wherein
the first type of request represents a synchronous request, and
the second type of request represents an asynchronous request.

3. The method of claim 1, wherein
the second request is reprioritized to the higher priority based upon receipt of a third request and accompanying request information indicating the second request and identifying the third request as a third type of request.

4. The method of claim 1, wherein
the first request is reprioritized to the lower priority based upon receipt of a fourth request and accompanying request information indicating the first request and identifying the fourth request as a fourth type of request.

5. The method of claim 4, wherein
the server responds to the fourth request with a no content response signaling reprioritization of the first request.

6. The method of claim 1, wherein
the previously-excluded second request within the deferred request queue is included within the standard request processing queue based upon the server workload falling below the first threshold.

7. The method of claim 1, wherein
the second request is included within the standard request processing queue based upon a wait time of the second request exceeding a predetermined second threshold value.

8. The method of claim 1, wherein
the request information is included within headers of the requests.

9. A server system having a standard request processing queue and a deferred request queue, comprising:
at least one hardware processor configured to initiate the following operations:
receiving, from a client and by the server system, a first request and accompanying request information identifying the first request as a first type of request;
selecting between the standard request processing queue and the deferred request queue based upon the first type of request;
including, based upon the selecting, the first request in the standard request processing queue;
receiving, by the server system, a second request and accompanying request information identifying the second request as a second type of request;
determining that a server workload of the server system exceeds a predetermined first threshold value; and
excluding, based upon the second type of request and only upon the determining, the second request from the standard request processing queue by including the second request in the deferred request queue, wherein the first type of request indicates a higher priority, and
the second type of request indicates a lower priority.

10. The server system of claim 9, wherein
the first type of request represents a synchronous request, and
the second type of request represents an asynchronous request.

11. The server system of claim 9, wherein
the second request is reprioritized to the higher priority based upon receipt of a third request and accompanying request information indicating the second request and identifying the third request as a third type of request.

12. The server system of claim 9, wherein
the first request is reprioritized to the lower priority based upon receipt of a fourth request and accompanying request information indicating the first request and identifying the fourth request as a fourth type of request.

13. The server system of claim 12, wherein
the server system responds to the fourth request with a no content response signaling reprioritization of the first request.

14. The server system of claim 9, wherein
the previously-excluded second request within the deferred request queue is included within the standard request processing queue based upon the server workload falling below the first threshold.

15. The server system of claim 9, wherein
the second request is included within the standard request processing queue based upon a wait time of the second request exceeding a predetermined second threshold value.

16. A computer program product, comprising:
a computer hardware storage device having stored therein program code,
the program code, which when executed by a computer hardware system including a server having a standard request processing queue and a deferred request queue, causes the computer hardware system to perform:
receiving, from a client and by the server, a first request and accompanying request information identifying the first request as a first type of request;
selecting between the standard request processing queue and the deferred request queue based upon the first type of request;
including, based upon the selecting, the first request in the standard request processing queue;
receiving, by the server, a second request and accompanying request information identifying the second request as a second type of request;
determining that a server workload of the server exceeds a predetermined first threshold value; and
excluding, based upon the second type of request and only upon the determining, the second request from the standard request processing queue by including the second request in the deferred request queue, wherein
the first type of request indicates a higher priority, and
the second type of request indicates a lower priority.

17. The computer program product of claim 16, wherein
the first type of request represents a synchronous request, and
the second type of request represents an asynchronous request.

18. The computer program product of claim 16, wherein
the second request is reprioritized to the higher priority based upon receipt of a third request and accompanying request information indicating the second request and identifying the third request as a third type of request.

19. The computer program product of claim 16, wherein the first request is reprioritized to the lower priority based upon receipt of a fourth request and accompanying request information indicating the first request and identifying the fourth request as a fourth type of request.

20. The computer program product of claim 16, wherein the second request is included within the standard request processing queue based upon a wait time of the second request exceeding a predetermined second threshold value.

\* \* \* \* \*